United States Patent
Nakazato et al.

(10) Patent No.: US 7,174,226 B2
(45) Date of Patent: Feb. 6, 2007

(54) NUMERICAL CONTROLLER FOR CARRYING OUT LEARNING CONTROL

(75) Inventors: Tomomi Nakazato, Kawasaki (JP); Takahiko Endo, Kokubunji (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/965,768

(22) Filed: Oct. 18, 2004

(65) Prior Publication Data

US 2005/0085939 A1 Apr. 21, 2005

(30) Foreign Application Priority Data

Oct. 20, 2003 (JP) .............................. 2003/359664

(51) Int. Cl.
*G05B 13/00* (2006.01)
*G06F 19/00* (2006.01)

(52) U.S. Cl. ........................................ 700/47; 700/159

(58) Field of Classification Search .................. 700/44, 700/45, 47–50, 159, 160, 169; 706/12, 14, 706/16, 23

See application file for complete search history.

(56) References Cited

U.S. PATENT DOCUMENTS

| | | | | |
|---|---|---|---|---|
| 5,019,763 A | * | 5/1991 | Komatsu | 318/571 |
| 5,773,938 A | * | 6/1998 | Seong et al. | 318/6 |
| 5,907,450 A | * | 5/1999 | Ishikawa | 360/78.09 |
| 6,107,771 A | * | 8/2000 | Maeda | 318/630 |
| 6,163,429 A | * | 12/2000 | Tousain et al. | 360/77.04 |
| 6,650,499 B1 | * | 11/2003 | Kusumoto | 360/77.04 |
| 6,697,711 B2 | * | 2/2004 | Yokono et al. | 700/245 |
| 6,903,527 B2 | * | 6/2005 | Toyozawa et al. | 318/568.13 |
| 7,016,799 B2 | * | 3/2006 | Dondi | 702/104 |
| 2003/0016607 A1 | * | 1/2003 | Cho et al. | 369/47.42 |
| 2003/0053383 A1 | * | 3/2003 | Watanabe | 369/44.34 |
| 2003/0090230 A1 | * | 5/2003 | Fujibayashi et al. | 318/625 |
| 2003/0144764 A1 | * | 7/2003 | Yokono et al. | 700/245 |
| 2004/0059460 A1 | * | 3/2004 | Endo | 700/188 |
| 2004/0145333 A1 | * | 7/2004 | Toyozawa et al. | 318/632 |
| 2004/0150363 A1 | * | 8/2004 | Toyozawa et al. | 318/568.13 |
| 2005/0256605 A1 | * | 11/2005 | Maeda et al. | 700/193 |

FOREIGN PATENT DOCUMENTS

| | | |
|---|---|---|
| JP | 06-274228 | 9/1994 |
| JP | 06-309021 | 11/1994 |
| JP | 2004-227163 | 8/2004 |

OTHER PUBLICATIONS

Japanese Office Action for Application No. 2003-359664; dated May 16, 2006.

* cited by examiner

*Primary Examiner*—Maria N. Von Buhr
(74) *Attorney, Agent, or Firm*—Staas & Halsey LLP

(57) ABSTRACT

A numerical controller having a learning control function executes commands in an NC program, starts performing learning control from a location where the same operation pattern starts occurring, and stops performing learning control at a location where the same operation pattern ends. Once a command that allows learning control is established in the NC program, the section in which learning control is carried out can be automatically determined.

11 Claims, 7 Drawing Sheets

```
<PATH TABLE>
S01 X01 Z01;
    .
    .
    .
S11 X11 Z11;
S12 X12 Z12;
    .
    .
    .
S21 X21 Z21;
S22 X22 Z22;
    .
    .
    .
S31 X31 Z31;
S32 X32 Z32;
    .
    .
M30;
```

FIG. 7

NUMERICAL CONTROLLER FOR CARRYING OUT LEARNING CONTROL

BACKGROUND OF THE INVENTION

1. Field of the Invention

The present invention relates to a numerical controller for carrying out learning control for controlling machine tools and other equipment.

2. Description of the Related Art

Learning control for improving machining accuracy is adopted when repeatedly commanding the same command pattern and executing the same command pattern in predetermined cycles to perform machining action. In learning control in which the same pattern is repeated in predetermined cycles, the position deviation is sampled and the correction data for a single cycle is stored on the basis of the position deviation, and, of the correction data, the correction data during sampling corresponding to the same command pattern is added to the position deviation during the current sampling to perform correction, as exemplified in Japanese Patent Application Laid-open No. 6-309021. This learning control is repeatedly executed, the correction data is sequentially updated, and the position deviation is ultimately brought to a value that is approximately "0." In this type of learning control, the position deviation is brought to a value that is approximately "0," so high machining accuracy can be achieved.

As described above, learning control repeatedly executes machining such that the same operation pattern is generated by the same command pattern, so high precision machining can be carried out. Conventionally, however, this learning control is applied solely to binary operations in which the same operation pattern is generated, whereas in operation with an ordinary NC program (ISO/EIA format), the same operation pattern is not generated even when the same NC program is executed, so application is not made to NC programs.

SUMMARY OF THE INVENTION

An object of the present invention is to provide a numerical controller which enables learning control to be applied also to an ordinary NC program (ISO/EIA format).

The numerical controller in accordance with the present invention has a learning control function for creating and storing correction data on the basis of position deviation in the same operation patterns, and correcting the position deviation at the time of execution of the same operation pattern on the basis of the correction data. Commands in an NC program are executed, learning control is started at a location where the same operation pattern starts occurring, and learning control is stopped at a location where the same operation pattern ends.

The embodiments of the numerical controller of the present invention have the following functions.

From among the commands in the NC program, commands which produce the same operation pattern to allow learning control or commands which do not allow learning control are discriminated from others and stored in advance, and it is determined automatically whether the location is where the same operation pattern starts occurring or where the learning control is stopped on the basis of the stored commands, so that learning control is carried out for the section where the same operation pattern occurs.

Codes for specifying the learning control start position and the learning control end position are provided, the learning control start position and the learning control end position are specified using the codes during the execution of the NC program, and learning control is carried out from the learning control start position to the learning control end position on the basis of the command codes.

The NC program is executed, ID codes are assigned to a plurality of same operation patterns that are generated, the correction data produced by learning control is stored, and correction data for learning control is selected and learning control is carried out for each pattern on the basis of the ID codes.

At the start and end of learning control, the correction value for correcting the position deviation is increased in a stepwise fashion at the start of learning control, and is reduced in a stepwise fashion at the end of learning control. The coefficient by which the correction value is multiplied is varied in a stepwise fashion with respect to the correction value obtained from learning control, and the position deviation is corrected with the value obtained by multiplying the correction value by the coefficient.

The correction data of the learning control is automatically invalidated when machining conditions have been modified.

A setting value for learning control when priority is placed on accuracy and a setting value for learning control when priority is placed on machining velocity are provided, and accuracy priority or machining velocity priority can be selected.

Correction data for learning control, which is obtained by varying the machining conditions for a single type of workpiece and executing a single NC program, is stored and any of the correction data may be selected to carry out learning control.

The correction data of the learning control and the information in the NC program that carried out the learning control are stored, and the correction data of the learning control is also selected and set automatically when the NC program is selected.

A function for notifying an external apparatus of the state of learning control is provided.

A portion of or the entire NC program is a program for describing the relationship between the time and the position of a movable shaft, or the relationship between the rotational angle of the spindle and the position of the movable shaft.

In operation with an ordinary NC program (ISO/EIA format) in accordance with the present invention, learning control is carried out in a section in which the same operation pattern is generated, so high precision machining can be carried out whereby the position deviation is reduced in machining with an ordinary NC program.

BRIEF DESCRIPTION OF THE DRAWINGS

The above-described and other objects and characteristics of the present invention are made apparent in the description of the embodiments below with reference to the attached diagrams.

FIG. 7 is an example of a program in another embodiment in which the present invention is applied.

DESCRIPTION OF THE PREFERRED EMBODIMENTS

Figure 1:
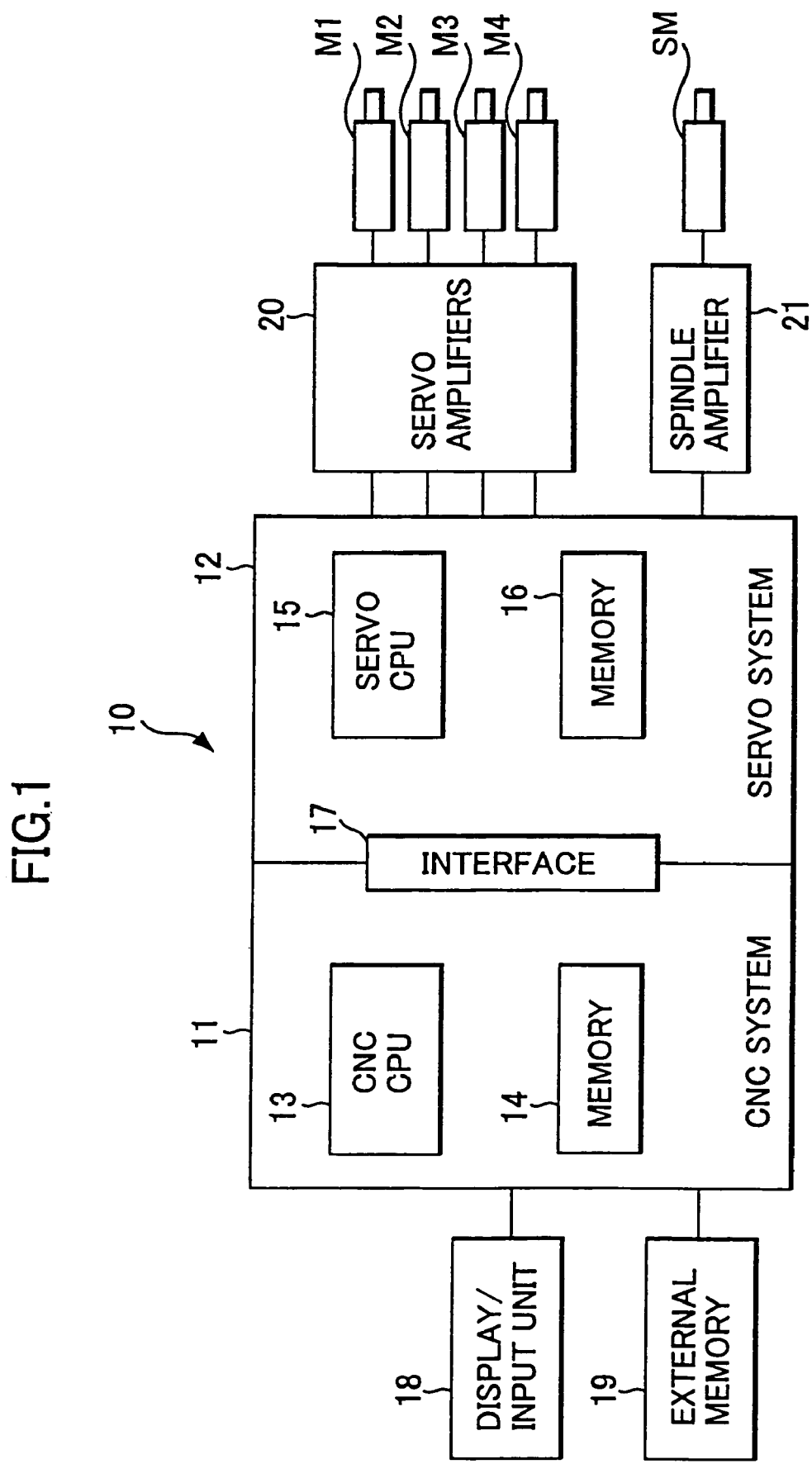
FIG. 1 is schematic diagram of the numerical controller of an embodiment of the present invention.

FIG. 1 is schematic diagram of the numerical controller of an embodiment of the present invention. The hardware configuration of the numerical controller is the same as a conventional numerical controller, and is therefore shown in a simplified manner. The numerical controller 10 is composed of a CNC system 11, a servo system 12, and an interface 17 that connects the CNC system 11 and the servo system 12 together.

The CNC system 11 has a processor 13 for numerical control, memory 14 composed of ROM, RAM, non-volatile RAM, or another type of memory, and display/input unit 18 comprising a display composed a CRT or liquid crystal and a keyboard or other input equipment. External memory 19 is configured so as to be connected to the CNC system 11 by way of an interface.

The servo system 12 has a servo circuit for controlling the position, velocity, and electric current of the servo motor that drives the shafts of machine tools and other equipment, and is provided with a control circuit for the spindle. Servo control for controlling the servomotor of each shaft, and control of the spindle are carried out through software. The servo system 12 has a processor 15 for the servo, and memory 16 composed of ROM, RAM, or another type of memory. Servomotors M1 to M4 for each shaft are connected to the servo system 12 by way of servo amplifiers 20. A spindle motor SM is connected to the servo system 12 by way of a spindle amplifier 21.

The processor 13 for the CNC system 11 reads and executes an NC program that has been input via external memory 19 or the display/input unit 18 and stored in the memory 14, performs distributed interpolation processing for each shaft on the basis of the movement commands that are issued in each block, and transmits movement commands to the servo system 12 for each shaft via the interface 17. The processor 15 for the servo system 12 performs loop processing for position, velocity, and electric current on the basis of the position/velocity feedback signal from the position/velocity detector provided to each servomotor and other equipment, as well as on the basis of the electric current feedback signal, and controllably drives the servomotors M1 to M4 for each shaft by way of the servo amplifiers 20. Velocity feedback control is carried out for the spindle motor SM in the same manner, and the spindle velocity is kept at the NC program command value.

The configuration and effect of the above-described numerical controller 10 is the same as a conventional numerical controller, but the processor 15 for the servo system 12 additionally carries out processing for learning control in the present embodiment.

Figure 2:
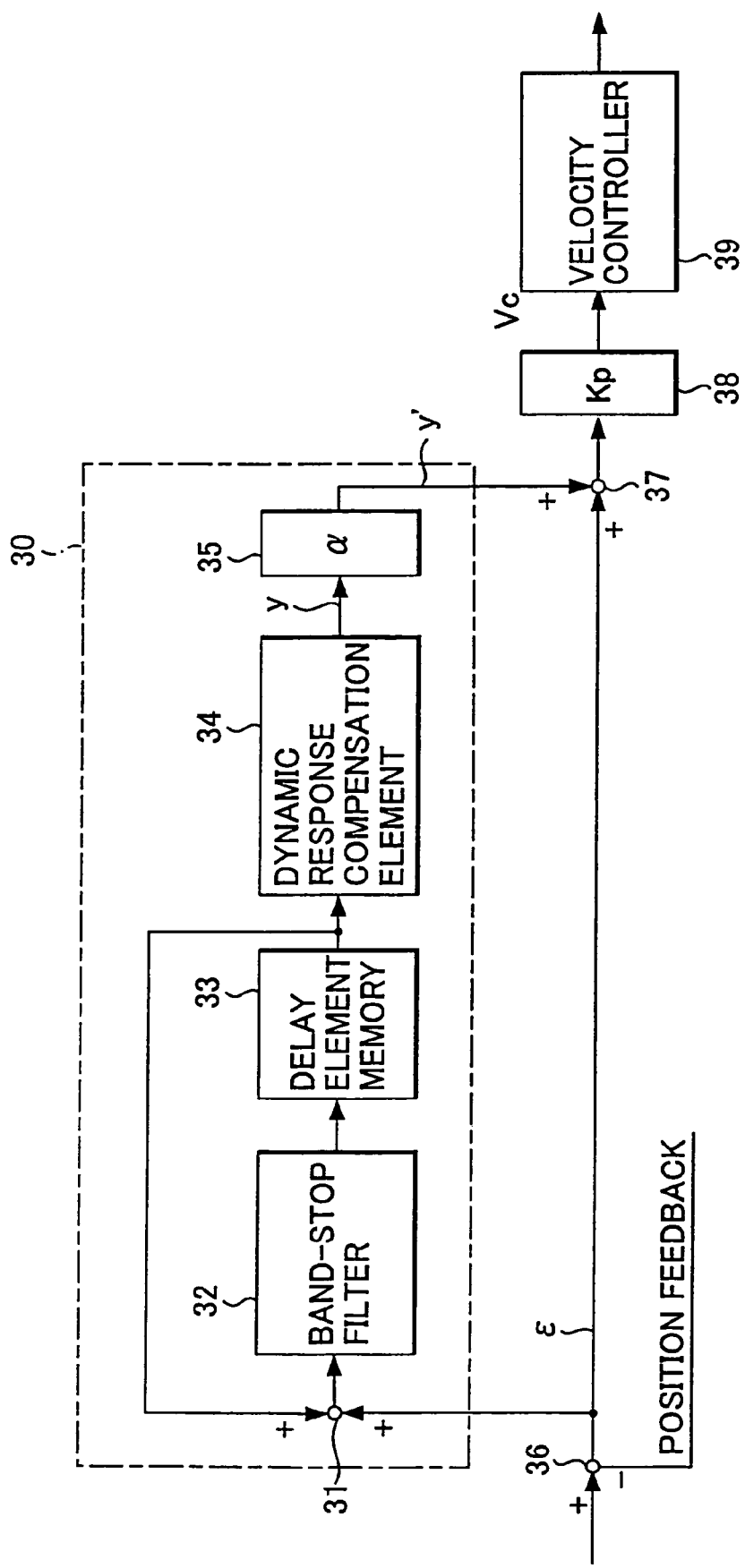
FIG. 2 is a portion of a block diagram of servo processing for controlling the servomotors, which is carried out by the processor, in the servo system of the numerical controller shown in FIG. 1.

FIG. 2 is a portion of a block diagram of servo processing for controlling the servomotors M1 to M4, which is carried out by the processor 15 in the servo system 12. In particular, a learning controller 30 for carrying out learning control is provided in the present embodiment. The learning controller 30 is one that is well known in the art, but differs from a conventional learning controller in this embodiment in that the learning controller 30 is provided with a term 35 for a coefficient α which is used for applying a stepwise processing (described later) to the correction value output from the learning controller 30.

When learning control is not carried out, the position feedback amount fed back from the position/velocity detector is subtracted in the subtractor 36 from the position command transmitted from the CNC system 11 to calculate the position deviation $\epsilon$, the position deviation is multiplied by the position loop gain Kp to calculate the velocity command, and the resulting velocity command is transmitted to the velocity control unit. Proportioning, integration, and other processing is performed in the velocity control unit on the basis of the velocity command and the velocity feedback amount that was fed back, and the electric current command is output to the electric current control unit. Loop control for the electric current is performed based on the received electric current command, and the servomotors M1 to M4 are driven and controlled by way of the servo amplifiers 20.

The learning controller 30 has an adder 31, a band-stop filter 32 provided for stabilizing the control system, a delay element memory 33 for storing the correction data of the number corresponding to the sampling number of a single cycle of the same command pattern, a dynamic characteristic correction element 34 for compensating for the phase delay and reduced gain of the control object, and a term 35 for the coefficient α, as shown in FIG. 2.

The position deviation is calculated each sampling cycle (position/velocity loop processing cycle). Correction data corresponding to the current sampling in the same command pattern is read from the delay element memory 33 each sampling cycle, the correction data thus read is multiplied by the coefficient α (when the hereinafter-described stepwise processing is not performed, the coefficient α is 1, or the term 35 for the coefficient α is not provided) following processing of the dynamic characteristics compensation element 34, and the product is taken as the output (correction value) of the learning controller 30. The output of the learning controller 30 and the position deviation described above are then added by the adder 37, and the added value is multiplied by the position loop gain Kp to calculate the velocity command Vc. The calculated velocity command Vc is input to the velocity control unit 39.

The correction data read from the delay element memory 33 in the current sampling is added to the position deviation in the adder 31, and the added value is processed by the band-stop filter 32. The data stored in the delay element memory 33 is then shifted a single place, and the output (correction data) of the band-stop filter 32 is stored in the memory area for storing the newest data.

As described above, of the correction data calculated based on the position deviation at each sampling in the processing of the same command pattern previously executed, the correction data in the current sampling at the time when the same command pattern is carried out is read out in learning control. The position deviation is corrected with the correction data that is based on the read correction data, the correction data is stored in the delay element memory 33 as correction data for the corresponding sampling when carrying out the next same command pattern, and the correction data in the delay element memory 33 is updated thereby. In other words, it is assumed that the same operation pattern will be generated by the same command pattern in order to carry out learning control.

However, it is not always the case that the same operation pattern will be generated when an ordinary NC program (ISO/EIA format) is repeatedly executed. The action timing becomes offset each time the NC program is executed when screw thread-cutting, M-coding, or other commands are given, and the same operation pattern is not carried out when the NC programs are executed. The NC program, on the other hand, may have a section in which the same operation pattern is repeatedly generated when executing programs with a continuous stream of commands. In a section in which linear interpolation commands, circular interpolation commands, or other commands, for example, occur in a continuous fashion, the machining timing in this section is the same as long as the machining conditions do not vary when the NC programs are executed, and the same operation pattern is repeatedly generated.

In view of the above, the processing executed by the NC program in the present invention is designed so that learning control is carried out automatically or by a program command only in the section in which the same operation pattern is performed.

First, described below is an embodiment for determining whether or not a command allows learning control, and for automatically determining the section in which learning control is carried out by NC program command.

The commands of an NC program, designed to repeatedly carry out the same command (operation) pattern with the same timing after processing has started by a command, are set and stored in advance as commands that allow learning control. In the section in which linear interpolation commands, circular interpolation commands, or other commands are carried out in a continuous fashion, the same command pattern is carried out with the same timing to generate the same operation pattern, for example, so the linear interpolation commands, circular interpolation commands, or other commands are set and stored in the NC program as commands that allow learning control. In a reverse arrangement, it is possible to set and store commands incapable of learning control in the NC program, whereby commands which are not set and stored can be determined to be commands capable of learning control.

Figure 3:
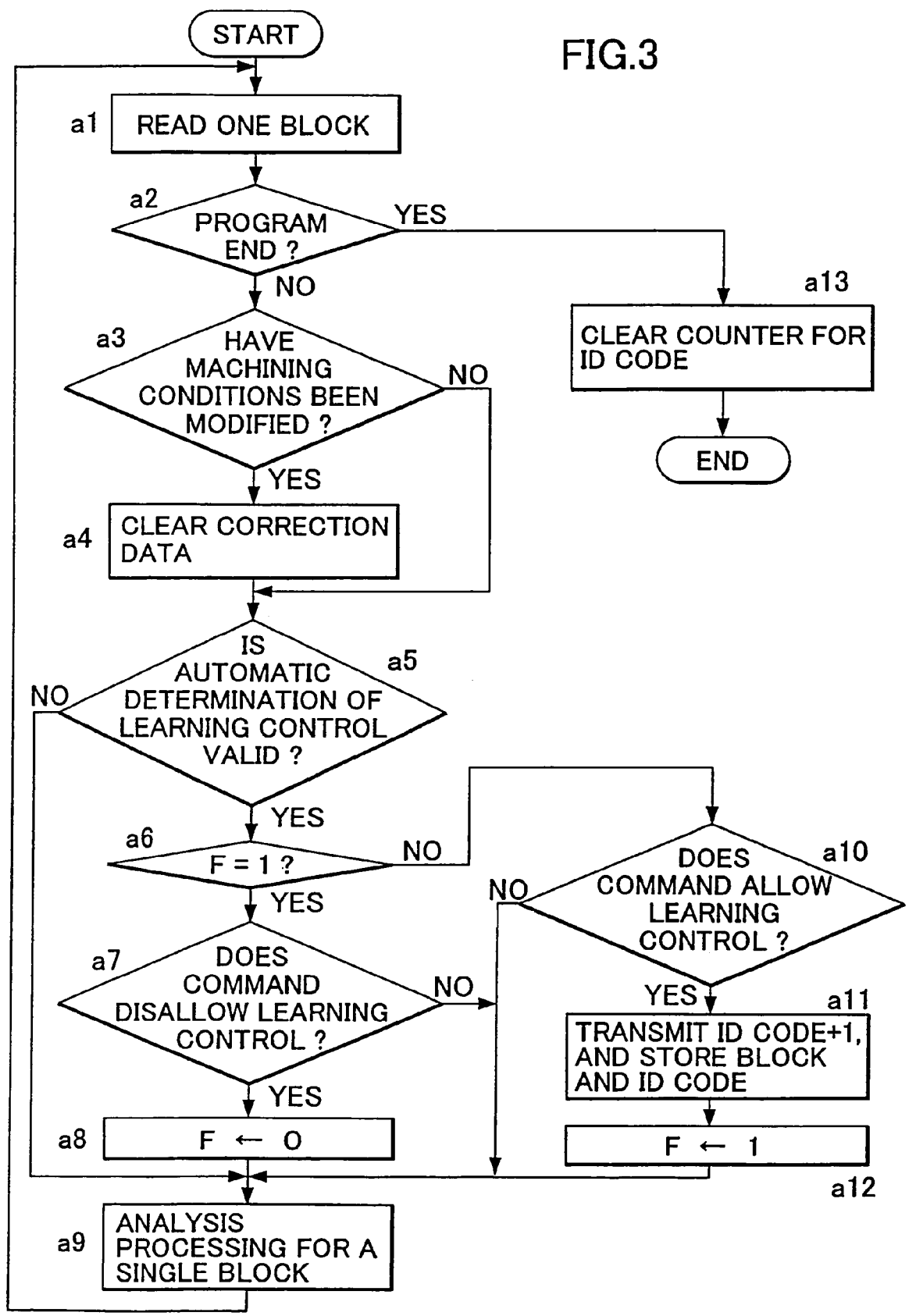
FIG. 3 is a flowchart of the preprocessing carried out each predetermined cycle by the processor of the CNC system of the numerical controller shown in FIG. 1.

FIG. 3 is a flowchart of the preprocessing carried out each cycle (each preprocessing cycle) by the processor 13 of the CNC system 11.

First, a single block is read (step a1) from the NC program, a determination (step a2) is made as to whether a command in that block is a program end command or not, and if not a program end command, then a determination (step a3) is made as to whether a command for changing the machining conditions has been input or not. When the program, parameters, offset, override value of the feed velocity, or other factors have been changed to vary the machining conditions, the command pattern (operation pattern) differs as a result, and the correction data produced by learning control carried out to the current point no longer retains any significance. Therefore, output is made to the servo system 12 so that the correction data stored in the delay element memory 33 of the learning controller 30 is cleared in step a4.

If there is no change in the machining conditions, then a determination (step a5) is made as to whether or not parameters have been set that make automatic determination of learning control valid, and if the parameters have not been set in the learning control automatic determination mode, then analysis processing of the current block is performed (step a9) and the process returns to step a1. Processing in which this learning control is not carried out is repeated thereafter.

When it has been determined that the parameter for making automatic determination of learning control valid has been set in step a5, then a determination is made (step a6) as to whether the flag F indicating that learning control is ON has been set or not, and if learning control is not ON, then a determination is made (step a10) as to whether the command read in step a1 is a command that allows learning control or not. In other words, it is determined whether the read command is one of the established commands that allow learning control. If the command does not allow learning control, then the process skips to step a9, and the normal processing described above is carried out.

If the read command is not a command that allows learning control, then 1 is added to the value of the counter for counting the ID code, and this value is taken as the ID code for this command and stored (step a11) together with the block. The counter that counts the ID code is initially set to "0." The flag indicating that learning control is ON is set, the learning control ON-state is stored (step a12) together with the block, the process skips to step a9, analysis processing for this block is carried out, and the process returns to step a1. The processing (steps a1 to a6) described above is then carried out, and the learning control ON flag, which was set by the processing in step a12 of the previous cycle, (F=1) is set in step a6, so the process advances from step a6 to step a7, and a determination is made as to whether or not the command read in step a1 is a command that does not allow learning control. In other words, a determination is made as to whether or not the command that was read is a command that is established as a command that allows learning control. If the command is not one that does not allow learning control (a command that allows learning control), the process skips to step a9, and learning control is kept ON.

Learning control is thereafter kept ON as long as a command that does not allow learning control is not read. When it has been determined that the command read in step a7 is a command that does not allow learning control, the learning control ON flag is set to OFF, the learning control OFF-state is stored (step a8) together with the block, and the process advances to step a9.

The processing of steps a1 to a6, a10, and a9 is thereafter repeatedly carried out until a command that allows learning control is read. The processing from step a10 through steps a11 and a12 is then performed when a command that allows learning control is read again, the ID code and the learning control ON-state are stored together with the block, the learning control flag is set to ON, and preprocessing is carried out. When a command that does not allow learning control is read (step a7) as each block is read, the learning control flag is set to OFF (step a8) and learning control OFF-state is stored together with the block.

In the preprocessing stage of the NC program as described above, when a command that allows learning control is read, the ID code and learning control ON-state are stored together with the current block; and when a command that does not allow learning control is read, on the other hand, learning control OFF-state is stored together with the current block.

When an instruction to end the program is read by the NC program, the counter for counting the ID code is cleared (step a13) and the preprocessing of the NC program is ended.

Figure 4:
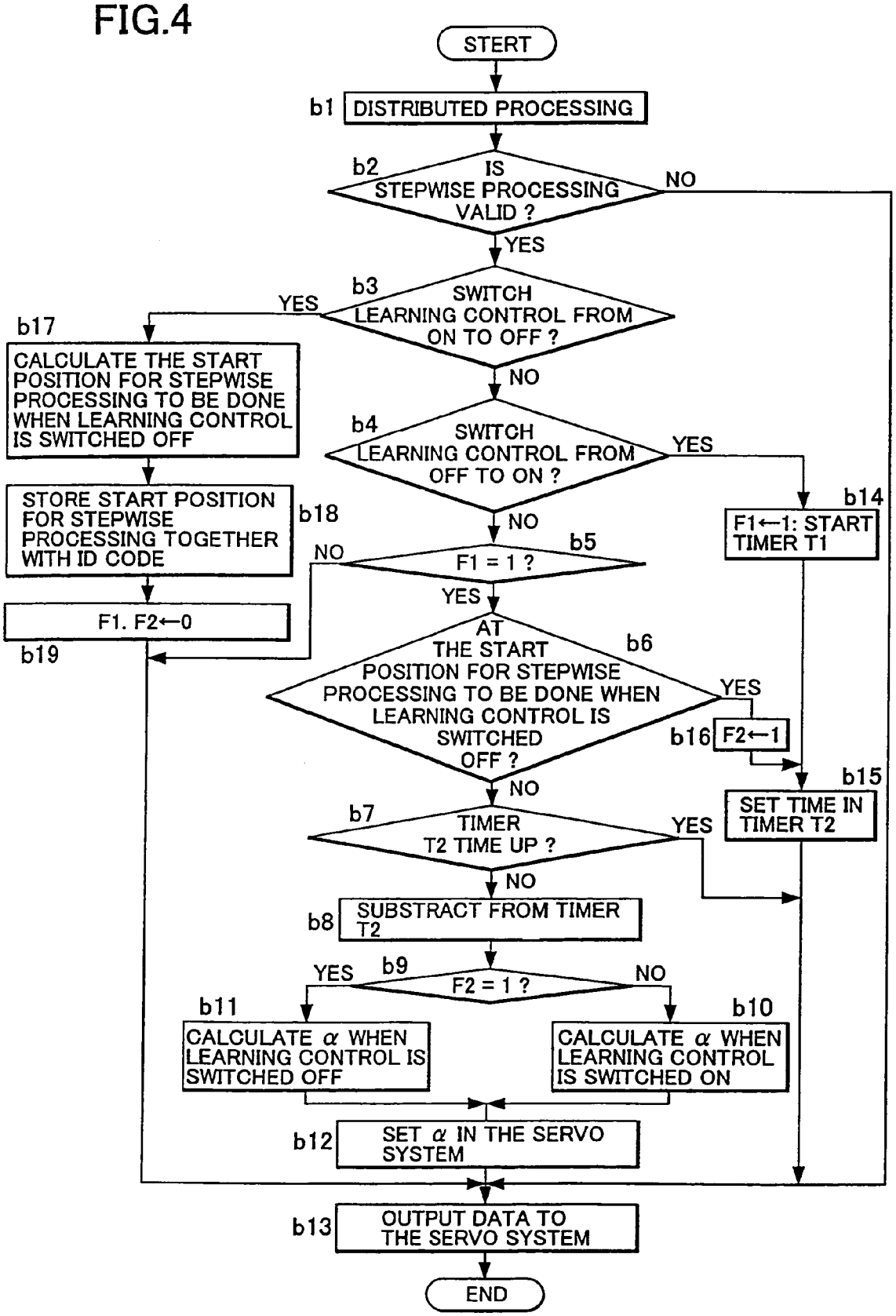
FIG. 4 is a flowchart of the main processing carried out each predetermined cycle by the processor of the CNC system of the numerical controller shown in FIG. 1.

FIG. 4 is a flowchart of the main processing carried out each cycle (each main processing cycle) by the processor 13 of the CNC system 11.

In the preprocessing stage as described above, distributed interpolation processing is carried out for each shaft on the basis of the data that has been analyzed and rendered executable by an NC program command. In this embodiment, the configuration allows a selection of whether or not to carry out a processing routine ("stepwise processing") wherein the effect of learning control is increased or decreased in a stepwise fashion in order to alleviate the mechanical shock that is potentially generated when learning control starts and ends. In other words, the configuration allows a selection of whether to perform processing that varies the value of the coefficient $\alpha$ shown in FIG. 2 in a stepwise fashion, or to fix the value to "1" (or to carry out the processing of the learning controller 30, which does not has a term for the coefficient $\alpha$).

First, described below is the processing (stepwise processing; processing for varying the coefficient $\alpha$ in a stepwise fashion) for varying the effect of the learning control in a stepwise fashion.

FIGS. 6A to 6F are diagrams showing the reasons for varying the effect of learning control in a stepwise fashion, and general descriptions of the operation thereof.

Figure 6A:
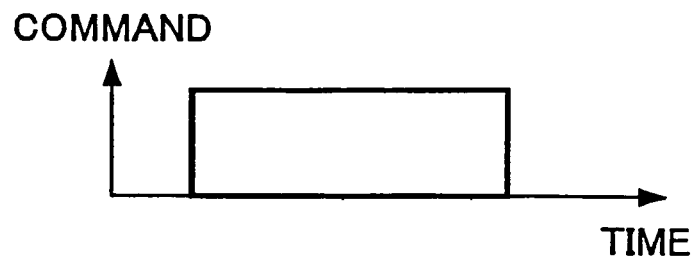
FIGS. 6A to 6F are diagrams showing the reasons for varying the effect of learning control in a stepwise fashion, and general descriptions of the operation thereof.
Figure 6B:
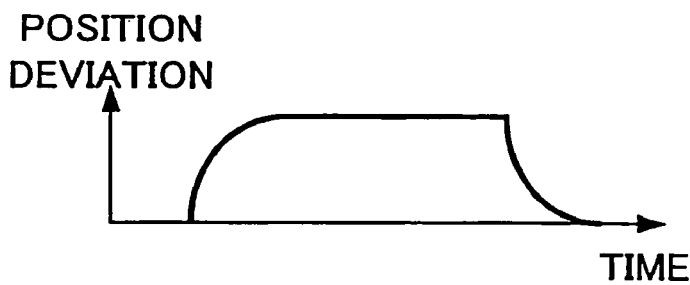

It is assumed that a position command such as that shown in FIG. 6A has been output. In FIG. 6A, the horizontal axis represents time, and the vertical axis represents the command movement amount (per fixed unit of time). (Hence, the vertical axis represents the command velocity). When learning control is not performed, position deviation such as that shown in FIG. 6B is generated. In FIG. 6B the horizontal axis and the vertical axis represent time and position deviation, respectively.

Figure 6C:
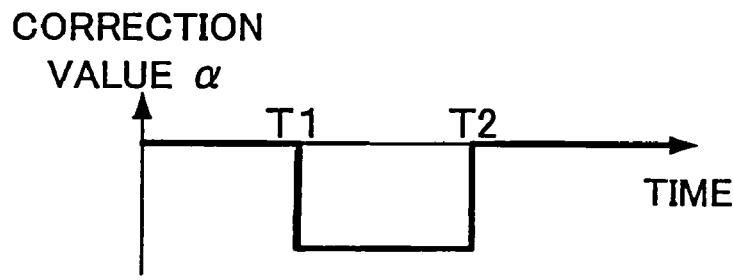
Figure 6D:
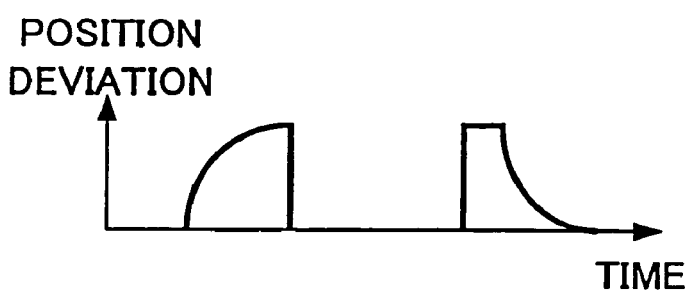

Here, it is assumed that learning control is ON from time t1 to t2, as shown in FIG. 6C. Learning control stores the value based on the position deviation generated in the operation of the pattern carried out earlier, as correction data, in the same command pattern, and corrects (refer to FIG. 2) the position deviation of the current pattern being executed with the aid of the stored correction data, so the position deviation is brought to a value that is approximately "0." For this reason, the position deviation rapidly decreases when learning control is switched ON at time t1, and position deviation rapidly increases when learning control is switched OFF at time t2, as shown in FIG. 6D. The velocity command is a product of multiplying the position deviation by the position loop gain Kp, so if the position deviation changes rapidly, then the velocity command also changes rapidly in accordance therewith. As a result, a shock is generated as the machine attempts to follow the rapid change in the velocity command.

Figure 6E:
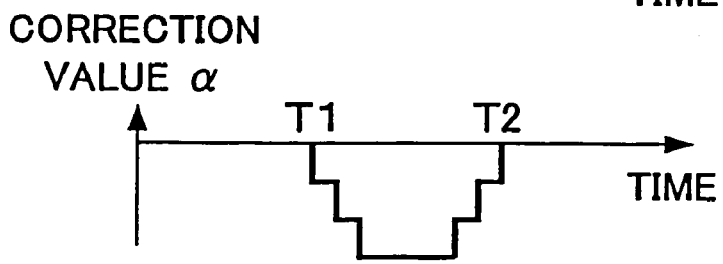
Figure 6F:
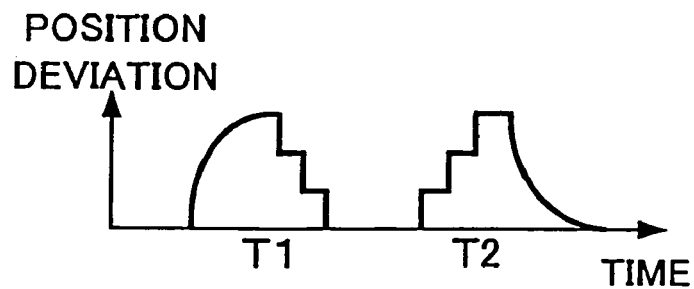

In view of the above, the effect of learning control is made to change in a stepwise fashion in the present embodiment, as shown in FIG. 6E. A term for the coefficient $\alpha$ is provided to the learning controller 30, as shown in FIG. 2, and the effect of correcting the learning control is alleviated by increasing or reducing the value of the coefficient $\alpha$ in a stepwise fashion. As a result, the position deviation is reduced or increased in a stepwise fashion to alleviate the shock, as shown in FIG. 6F.

Referring once again to the main processing shown in FIG. 4, the processor 13 of the CNC system 11 performs processing for distributing the movement command to each axis in the same manner as prior art on the basis of the data in the block analyzed in the preprocessing shown in FIG. 3. Next, a determination (step b2) is made as to whether or not the parameter has been set so as to validate stepwise processing, and if the parameter has not been set so as to allow stepwise processing, the process skips to step b13, and data distributed in a conventional manner is output to the servo system 12. However, when an ID code and learning control ON/OFF signal are added to the block, the ID code and learning control ON or OFF signal are also transmitted to the servo system 12.

When stepwise processing is valid, a determination is made (step b3) as to whether or not learning control OFF data has been added to the analyzed block.

When learning control OFF data is not read, a determination is subsequently made (step b4) as to whether learning control data ON has been read or not, and if this data is also not read, then a determination is made (step b5) as to whether the flag F1 indicating that learning control is ON is "1" or not. If the flag F1 is not "1," then the process skips to step b13. In other words, a command that allows learning control has not yet been read, so processing is carried out in a conventional manner in that the data distributed in step b1 is output to the servo system 12.

When it has been determined in step b4 that learning control ON data has been read, the flag F1 indicating that learning control is ON is set (the flag F1 is initially set to "0") to "1," and the timer T1 is reset and started (step b14). The time set for processing (stepwise processing) that varies the effect of learning control in a stepwise fashion is set (step b15) in the timer T2, and the process advances to step b13. Learning control ON data has been read at this time; therefore, in step b13, this learning control ON data and the ID code stored together with the data are output to the servo system 12 together with data distributed in step b1.

In the next cycle, the flag F1 indicating that the learning control is ON is set to "1," so the process advances from step b5 to step b6, and a determination is made as to whether or not the time recorded in the timer T1 has reached the start position for stepwise processing to be done when learning control is switched OFF, which is stored in association with the ID code of the learning control currently being carried out. The start position for stepwise processing is stored in association with the ID code by the processing in the later-described steps b17 and b18. This start position is not yet started at the time when the NC program is first executed, and for this reason, the resulting determination in step b6 is "No" and the process advances to step b7.

In step b7, a determination is made as to whether the time set in timer T2 in step b15 has expired or not, and if the time has expired, then a set predetermined amount is subtracted (step b8) from the timer T2. Next, a determination is made as to whether or not the flag F2 is set to 1, indicating that stepwise processing to be done when learning control is switched OFF is being carried out. The flag F2 is initially set to "0," therefore the process advances to step b10 and the coefficient $\alpha$ for stepwise processing to be done when learning control is switched ON is calculated. The coefficient $\alpha$ is, for example, calculated by the equation $\alpha=(ts-t)/ts$, wherein ts is the value set in step b15 and t is the current value of the timer T2 subtracted in step b8.

The coefficient $\alpha$ calculated in this manner is transmitted to the servo system 12 and set as a value that is multiplied by the correction data of the learning controller 30. The process advances to step b13 and the distributed processing data is output to the servo system 12.

The processing of steps b1 to b10, b12, and b13 is performed thereafter for each cycle, the coefficient $\alpha$ is gradually increased. When the coefficient $\alpha$ reaches "1," and the timer T2 expires, the process skips from step b7 to step 13, the output of the coefficient α is stopped, and the coefficient α is fixed at "1." The processing of steps b1 to b7, and step b13 is repeated thereafter.

In step b3, if it is determined that data indicating that learning control is OFF has been read, whereupon the set time is subtracted from the current value of the timer T1; the start position (elapsed time from the start of learning control) for stepwise processing, performed during the OFF-state of learning control and used in the subsequent execution of the NC program, is calculated (step b17); and the calculated start position for stepwise processing is stored (step b18) together with the ID code. The flags F1 and F2 are both set to "0" (step b19). The process then advances to step b13, and the distributed processing data is output, but in this case, the data indicating that learning control is OFF is output to the servo system 12.

The start position for stepwise processing to be done at the time when learning control is OFF is stored together with the ID code in step b18, so in the subsequent execution of the NC program in step b6, a determination is made as to whether or not the value of the timer T1 has reached the start position for stepwise processing to be done when learning control is switched OFF, which corresponds to the current ID code. If the start position has been reached, then the flag F2 indicating that stepwise processing to be done when learning control is switched OFF is being carried out is set to "1" (step b16), and the set time is set in the timer T2 (step b15). From the next cycle, the processing of steps b1 to b9 is carried out, and the flag F2 is then detected to be "1" in step b9, so the process advances to step b11, and the coefficient α for the state in which learning control is OFF is calculated and output (step b12) to the servo system 12.

The coefficient α for the state in which learning control is OFF is calculated with the equation α=t/ts, wherein ts is the value set in step b15 and t is the current value of the timer T2 subtracted in step b8. When data indicating that learning control is OFF is read, then the process advances from step b3 to step b17 and the above-described processing is carried out.

As described above, the coefficient α for increasing or decreasing the effect of learning control in a stepwise fashion is calculated and sent to the servo system 12.

Figure 5:
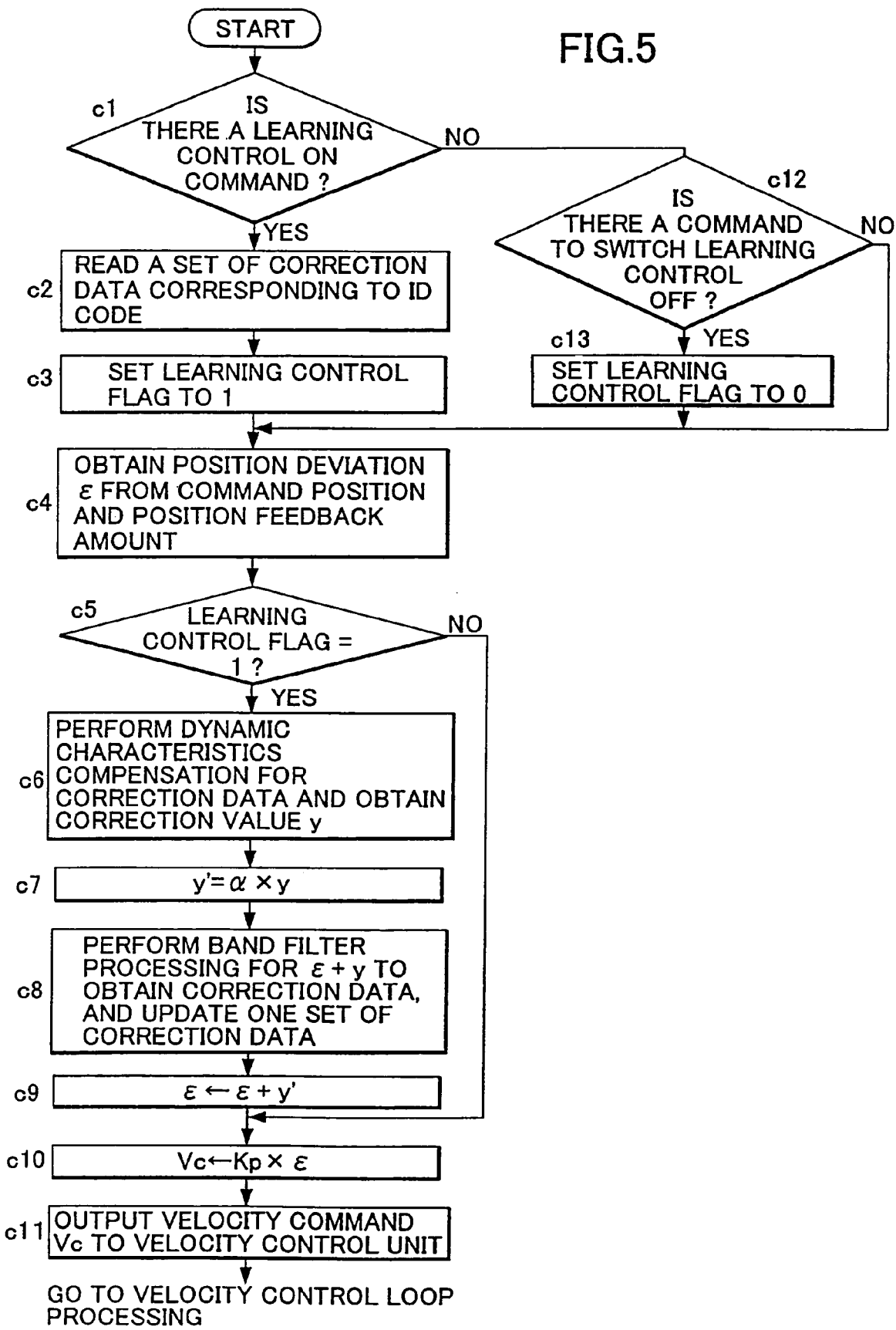
FIG. 5 is a flowchart of position loop processing and learning control processing by the servo system, carried out by the processor of the servo system of the numerical controller shown in FIG. 1 each predetermined cycle.

The processor 15 for the servo system 12 carries out the processing shown in FIG. 5 each predetermined cycle (or each position/velocity loop processing cycle).

A determination is made (step c1) as to whether or not there is data indicating that learning control is to be switched ON in the data sent from the CNC system 11. If data indicating that learning control is to be switched ON has not been sent, then a determination is made (step c12) as to whether or not data indicating that learning control is OFF has been sent, and if this data has also not been sent, then processing (step c4) for calculating the position deviation ε is performed in a conventional manner from the feedback amount of the position and the command position that has been sent.

Next, a determination (step c5) is made as to whether the flag indicating that learning control is ON is "1" or not. If the flag is not "1," then the velocity command Vc is calculated (step c10) by multiplying the position deviation ε by the position loop gain Kp in the same manner as in the prior art, and the velocity command Vc is output to the velocity command unit. Proportioning, integration, and other types of velocity loop processing are performed in the velocity control unit on the basis of the velocity command Vc and the velocity feedback signal. This processing is the same as in the prior art, so a description thereof is omitted.

The above description is that of position loop processing in the servo system 12 when learning control is not being performed. When data indicating that learning control is ON is read in step c1, the set of correction data stored in correspondence with the ID code sent together with the data is read (step c2). In other words, read is the set of correction data (the correction data of the number corresponding to the sampling number of a single cycle) stored in the delay element memory 33 of the learning controller 30 in FIG. 2, which is the data stored for each ID code using the first-in first-out format (FIFO). As any set of correction data has not yet been created when the NC program is first executed, a memory for storing correction data for the ID code is just prepared in this case. Next, the flag indicating that learning control is ON is set to "1" (step c3), and the position deviation ε is calculated (step c4) from the feedback amount of the position and the command position that have been sent.

As the flag indicating that learning control is ON is set to "1" (step c5), the first correction data (the first stored data (oldest data)) is read from the correction data that is read in step c2, and dynamic characteristics compensation processing is carried out in a conventional manner to calculate the correction value y (step c6).

Further, the stored coefficient α that has been output from the CNC system 11 is multiplied by the correction value y to calculate the step correction value y' (step c7). The read correction value y is added to the position deviation ε calculated in step c4, the added value (ε+y) is processed in the band-stop filter 32 shown in FIG. 2 to calculate the correction data, and the result is stored as the newest correction data. A set of correction data is updated in this manner (step c8).

Also, by adding the step correction value y' calculated in step c7 to the position deviation ε calculated in step c4, the position deviation is corrected (step c9) by learning control, the position loop gain Kp is multiplied by the position deviation for which correction has been made to calculate (step c10) the velocity command Vc, and the calculated velocity control Vc is transmitted to the velocity control unit.

From the next cycle, the processing of steps c1, c12, c4, and c5 to c11 is repeatedly carried out. When data indicating that learning control is OFF is read, the process advances from c12 to c13, the flag indicating the learning control is ON is set to "0," the process advances to step c4, and the processing of step c4, step c5, and steps c10 to c11 is carried out. From the next cycle, the processing of step c1, step c12, steps c4 and c5, and steps c10 to c11 is carried out because the flag indicating the learning control is ON is set to "0."

As described above, by setting the parameters so that learning control is automatically started from this command and stepwise processing is performed when a command that allows learning control is read by the NC program, the correction value produced by learning control is applied so as to increase in a stepwise fashion when learning control is ON, while the correction value produced by learning control is applied so as to decrease in a stepwise fashion when learning control is OFF.

In the embodiment described above, whether to start or end learning control from a command in the NC program is automatically determined from the type of program command, but the determination is not necessarily automatically made from the type of programmed command. A learning control ON command (Gaaa, for example) and a learning control OFF command (Gbbb, for example) may be issued (aaa and bbb are numbers in G code) in the NC program, and the IC code may be issued together with the learning control ON command (Gaaa). (A counter may be provided, and the ID code may be determined based on the number of learning control ON commands counted from the beginning of the NC program.) In this case, the determinations made in step c7 and step c10 of FIG. 3 replace the determination as to whether the command is a learning control OFF command or a learning control ON command.

In the embodiment described above, when the feed velocity, offset value, or other machining conditions have changed in step a3 of FIG. 3, the correction data for learning control is cleared by the processing in step a4, so the correction data for learning control in new machining conditions can be automatically created. It is also possible to transmit and store the correction data for learning control created with various machining conditions in the memory in the CNC system 11, to read the correction data corresponding to the machining conditions when required, to transmit the data to the servo system 12, and to use the correction data. The correction data may also be output and stored in external memory 19. Shorter learning time can be ensured by inputting data to the numerical controller 10 and using the stored correction data. An ID code is assigned to the same operation pattern that performs learning control, and the correction data of the learning control is stored, so an ID code may be specified and learning control may be carried out for only the operation pattern of the specified ID code.

By adding to the ID code information that differs according to machining conditions or the like at the time when learning is carried out, learning control can be immediately performed by specifying the correction data of the learning control that corresponds to the machining conditions at that time through the use of external signals, NC program parameters, or other methods when the same type of work is to be carried out.

By also storing NC program information that has carried out the learning control together with the ID code, the correction data for learning control can also be simultaneously selected when the NC program to be executed is selected.

Learning control brings the position deviation to approximately zero by repeatedly carrying out the same command pattern, and when external disturbances are considerable, as in rough machining and high velocity machining, a phenomenon occurs whereby learning control does not stabilize. In this case, stabilized machining can be carried out, even in rough machining or high speed machining, by varying learning control settings such as changing the bandwidth of the band-stop filter 32 of the learning controller 30 so as to stabilize a control. In view of the above, the settings for learning control can be changed for machining velocity priority when performing rough machining or high velocity machining, or for accuracy priority when performing machining that requires accuracy. This can be achieved by varying the settings (the band-stop filter 32 setting, for example) of learning control, as when the coefficient α was varied.

The ON/OFF state of learning control and the state of position deviation may be read from the servo system 12 to the CNC system 11, and the read data may be displayed to the display screen of the display/input unit 18. The range of the position deviation may be set in advance, and the presence of position deviation within this range may be monitored.

In the embodiment described above, the portion for which the same operation pattern is carried out may be separated from the NC program, and learning control may be applied to that portion in an ordinary NC program, but other than this type of NC program, the learning control of the present invention may also be applied when executing a program, such as that shown, for example, in FIG. 7, in which an association is made, for example, between the positions on the X and Z axes of a feed shaft in relation to the rotational angle of the spindle.

In FIG. 7, <PATH TABLE> is a program name; S01, S11, and so forth are the rotational positions of the spindle; X01, X11, and so forth are the positions of the movable X shaft; and Z01, Z11, and so forth indicate the positions of the movable Z shaft. "S11 X11 Z11" show that when S11 is the rotational angle of the spindle, X11 is the position of the movable X shaft, and Z11 is the position of the movable Z shaft.

The positions of the movable shafts may be specified with reference to time instead of the rotational position of the spindle.

What is claimed is:

1. A numerical controller, comprising:
   a learning controller carrying out learning control for creating and storing correction data on the basis of a position deviation in same operation patterns executed by the numerical controller that are generated when an NC program is repeatedly executed, and correcting the position deviation at execution of the same operation patterns on the basis of the correction data, and when commands in the NC program are executed, learning control is started at a location where same operation patterns start occurring, and learning control is stopped at a location where same operation patterns end,
   wherein the numerical controller discriminates and stores, from among the commands in the NC program, commands which produce the same operation patterns to carry out learning control or commands which do not carry out learning control prior to execution of the NC program, and determines whether a location is where the same operation patterns start occurring or where the learning control is stopped on the basis of the stored commands, so that learning control is carried out for a section where the same operation patterns occur.

2. The numerical controller according to claim 1, said numerical controller providing codes for specifying a learning control start position and a learning control end position during the execution of the NC program, and carrying out learning control from the learning control start position to the learning control end position on the basis of the codes.

3. The numerical controller according to claim 1, said numerical controller generating several types of same operation patterns and assigning ID codes to several types of same operation patterns that are generated when the NC program is executed, storing the correction data produced by learning control, and selecting correction data for learning control and carrying out learning control for each pattern on the basis of the ID codes.

4. The numerical controller according to claim 1, said numerical controller increasing a correction value for correcting the position deviation in a stepwise fashion at the start of learning control and reducing the correction value in a stepwise fashion at the end of learning control.

5. The numerical controller according to claim 4, said numerical controller multiplying the correction value by a coefficient, varying the coefficient by which the correction value is multiplied in a stepwise fashion with respect to the correction value obtained from learning control, and correcting the position deviation with a second value obtained by multiplying the correction value by the coefficient.

6. The numerical controller according to claim 1, said numerical controller modifying machining conditions and, when a determination is made that machining conditions are modified, clearing the correction data of the learning control stored in the learning controller.

7. The numerical controller according to claim 1, said numerical controller providing a setting value for learning control when high velocity machining is to be performed and a setting value for learning control when accuracy in machining is required such that the numerical controller selects the setting value for when high velocity machining is to be performed or the setting value for when accuracy in machining is required based on whether high velocity machining is to be performed or accuracy in machining is required.

8. The numerical controller according to claim 1, said numerical controller storing correction data for learning control, which is obtained by executing a single NC program while varying machining conditions for a single type of workpiece, prior to executing the NC program, so that learning control is carried out by selecting any of the correction data.

9. The numerical controller according to claim 1, said numerical controller storing the correction data of the learning control and information in the NC program that carried out the learning control, selecting the NC program, and selecting and setting the correction data of the learning control when the NC program is selected.

10. The numerical controller according to claim 1, having a function for notifying an external apparatus of a state of learning control.

11. The numerical controller according to claim 1, said numerical controller executing the entire NC program or a part thereof, which is a program describing a relationship between a time and a position of a movable shaft, or a relationship between a rotational angle of a spindle and a position of the movable shaft.

* * * * *